United States Patent
Sangili

(10) Patent No.: US 7,870,543 B2
(45) Date of Patent: Jan. 11, 2011

(54) DYNAMIC TUNING OF USER-SPACE PROCESS

(75) Inventor: Vasudevan Sangili, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1068 days.

(21) Appl. No.: 11/608,629

(22) Filed: Dec. 8, 2006

(65) Prior Publication Data

US 2008/0136832 A1    Jun. 12, 2008

(51) Int. Cl.
*G06F 9/45* (2006.01)

(52) U.S. Cl. .................. 717/153; 717/111; 717/151; 717/154

(58) Field of Classification Search .................. 717/153
See application file for complete search history.

(56) References Cited

U.S. PATENT DOCUMENTS

| | | | |
|---|---|---|---|
| 5,953,534 A | 9/1999 | Romer et al. | |
| 6,059,842 A * | 5/2000 | Dumarot et al. | 717/153 |
| 6,219,825 B1 * | 4/2001 | Burch et al. | 717/158 |
| 6,622,300 B1 * | 9/2003 | Krishnaswamy et al. | 717/130 |
| 6,782,410 B1 | 8/2004 | Bhagat et al. | |
| 6,829,662 B2 | 12/2004 | King-Smith et al. | |
| 7,000,222 B1 | 2/2006 | Curtis et al. | |
| 7,587,510 B1 * | 9/2009 | Klager et al. | 709/232 |
| 2004/0015930 A1 * | 1/2004 | Wu | 717/158 |
| 2004/0054992 A1 * | 3/2004 | Nair et al. | 717/138 |
| 2004/0133893 A1 | 7/2004 | Carbone et al. | |
| 2004/0154021 A1 | 8/2004 | Sangili | |
| 2005/0028151 A1 * | 2/2005 | Roth et al. | 717/162 |
| 2005/0283765 A1 * | 12/2005 | Warren et al. | 717/131 |
| 2006/0010425 A1 | 1/2006 | Willadsen et al. | |
| 2007/0061784 A1 * | 3/2007 | Prakash et al. | 717/127 |
| 2007/0061785 A1 * | 3/2007 | Prakash | 717/127 |

* cited by examiner

*Primary Examiner*—Thomas K Pham

(57) ABSTRACT

One embodiment relates to a method for dynamic tuning of a user-space process. The method attaches to the user-space process. Load-time and compile-time base addresses of a data section of an object to be tuned are read. An offset to a symbol to be tuned is determined, and an effective address of the symbol is computed. A new value of the symbol is then written. Other embodiments and features are also disclosed.

20 Claims, 3 Drawing Sheets

… (US 7,870,543 B2)

DYNAMIC TUNING OF USER-SPACE PROCESS

BACKGROUND OF THE INVENTION

1. Field of the Invention

The present invention relates generally to software and computer systems.

2. Description of the Background Art

A program environment typically includes an array of environment variables that are made available when a process begins. A general purpose of such environment variables is to customize or tune the dynamic behavior of the programs in which they are used. For example, the C/C++ programming language provides the ability to adjust a program's run-time behavior through the use of environment variables.

Environment variables may be queried by an application, such that the behavior of the application varies based on their values. As such, environment variables provide a static mechanism for tuning user-space components.

There are problems and limitations, however, in using environment variables to perform dynamic tuning of user-space components. Dynamic tuning of user-space components refers to modifying the behavior of a user-space process after startup time, i.e. while the process is executing.

Environment variables are generally effective for all programs running in an environment. In other words, modifying an environment variable affects the behavior of all programs using that variable in the environment. Hence, an environment variable cannot be used to dynamically tune a specific instance of an application without affecting other executing programs which also use that same variable.

Besides environment variables, another technique for dynamic tuning of user-space components involves allocating a shared memory segment at startup time by the process to be tuned. Subsequently, a tool program may connect to the shared memory segment to modify configuration data therein for the purpose of the dynamic tuning. Unfortunately, allocating shared memory segments is expensive in terms of resources. Furthermore, this solution is not well suited for system shared libraries.

Yet another technique for dynamic tuning in user-space may be to send some signal that causes a signal handler in user-space to read the configuration data. However, this solution leads to the restriction that these signals cannot be used for other ("real") application needs. Moreover, this solution is not practical for system shared libraries.

SUMMARY

One embodiment relates to a method for dynamic tuning of a user-space process. The method attaches to the user-space process. Load-time and compile-time base addresses of a data section of an object to be tuned are read. An offset to a symbol to be tuned is determined, and an effective address of the symbol is computed. A new value of the symbol is then written.

Another embodiment relates to an apparatus for dynamic tuning of a user-space process. The apparatus includes processor-executable code. Processor-executable code is configured to attach to the user-space process, and to read load-time and compile-time base addresses of a data section of an object to be tuned. In addition, processor-executable code is configured to determine an offset to a symbol to be tuned, to compute an effective address of the symbol, and to write a new value for the symbol.

Other embodiments and features are also disclosed.

DETAILED DESCRIPTION

The present disclosure provides an advantageous technique for performing dynamic user-space tuning.

Example Computer System

Figure 1:
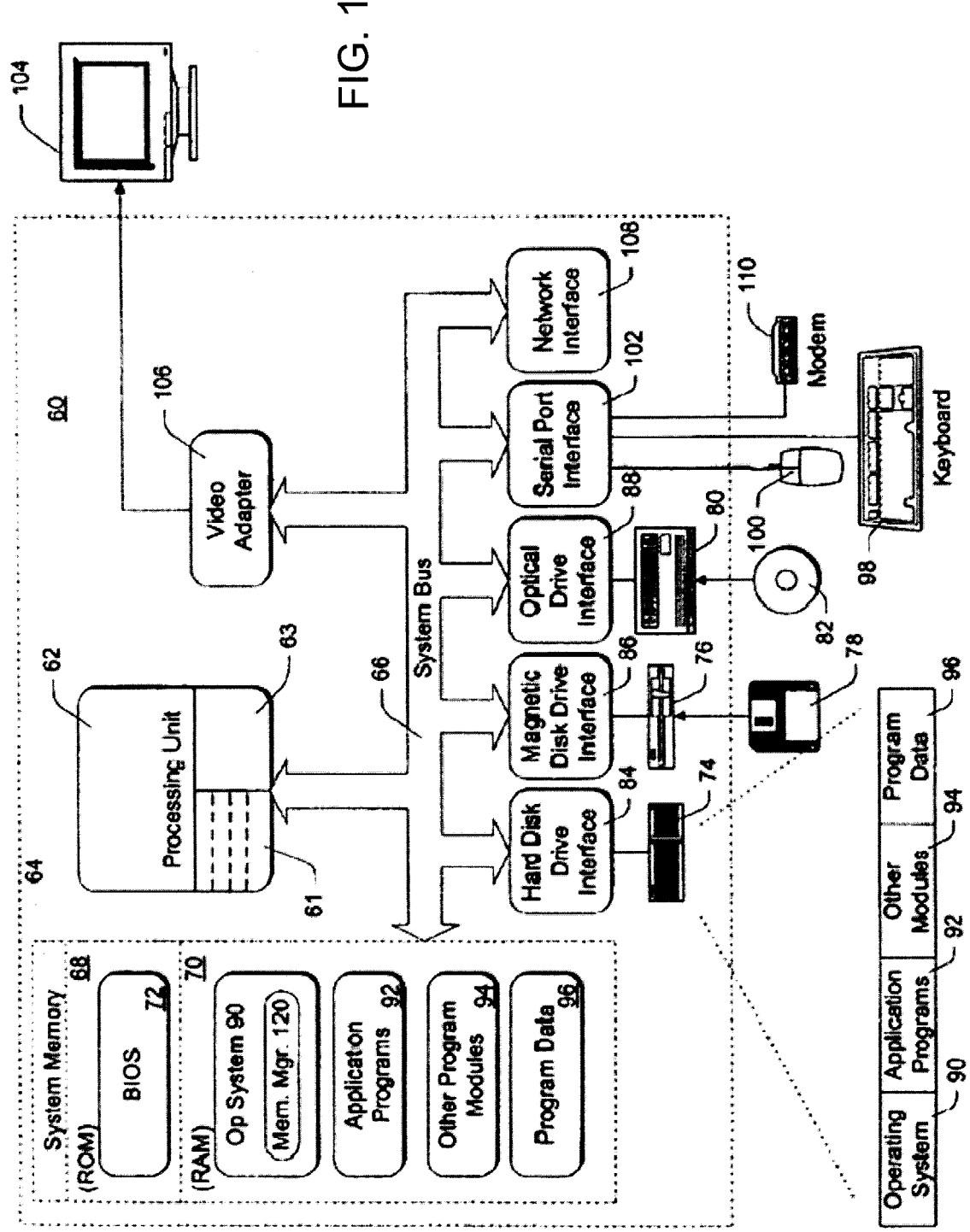
FIG. 1 is a schematic diagram of an exemplary computer system in the context of which an embodiment of the invention may be implemented.

An embodiment of the invention may be implemented in the context of a computer system, such as, for example, the computer system 60 depicted in FIG. 1. Other embodiments of the invention may be implemented in the context of different types of computer systems or other systems.

The computer system 60 may be configured with a processing unit 62, a system memory 64, and a system bus 66 that couples various system components together, including the system memory 64 to the processing unit 62. The system bus 66 may be any of several types of bus structures including a memory bus or memory controller, a peripheral bus, and a local bus using any of a variety of bus architectures.

Processor 62 typically includes cache circuitry 61, which includes cache memories having cache lines, and pre-fetch circuitry 63. The processor 62, the cache circuitry 61 and the pre-fetch circuitry 63 operate with each other as known in the art. The system memory 64 includes read only memory (ROM) 68 and random access memory (RAM) 70. A basic input/output system 72 (BIOS) is stored in ROM 68.

The computer system 60 may also be configured with one or more of the following drives: a hard disk drive 74 for reading from and writing to a hard disk, a magnetic disk drive 76 for reading from or writing to a removable magnetic disk 78, and an optical disk drive 80 for reading from or writing to a removable optical disk 82 such as a CD ROM or other optical media. The hard disk drive 74, magnetic disk drive 76, and optical disk drive 80 may be connected to the system bus 66 by a hard disk drive interface 84, a magnetic disk drive interface 86, and an optical drive interface 88, respectively. The drives and their associated computer-readable media provide nonvolatile storage of computer readable instructions, data structures, program modules and other data for the computer system 60. Other forms of data storage may also be used.

A number of program modules may be stored on the hard disk, magnetic disk 78, optical disk 82, ROM 68, and/or RAM 70. These programs include an operating system 90, one or more application programs 92, other program modules 94, and program data 96. The other program modules 94 may include utility programs and library modules, for example.

The operating system 90 may be configured with a memory manager 120. The memory manager 120 may be configured to handle allocations, reallocations, and de-allocations of RAM 70 for one or more application programs 92, other program modules 94, or internal kernel operations. The memory manager may be tasked with dividing memory resources among these executables.

A user may enter commands and information into the computer system 60 through input devices such as a keyboard 98 and a mouse 100 or other input devices. These and other input devices are often connected to the processing unit 62 through a serial port interface 102 that is coupled to the system bus 66, but may be connected by other interfaces, such as a parallel port, game port, or a universal serial bus (USB). A monitor 104 or other type of display device may also be connected to the system bus 66 via an interface, such as a video adapter 106. In addition to the monitor, personal computers typically include other peripheral output devices (not shown) such as speakers and printers. The computer system 60 may also have a network interface or adapter 108, a modem 110, or other means for establishing communications over a network (e.g., LAN, Internet, etc.).

Dynamic Tuning of a User-Space Process

Figure 2:
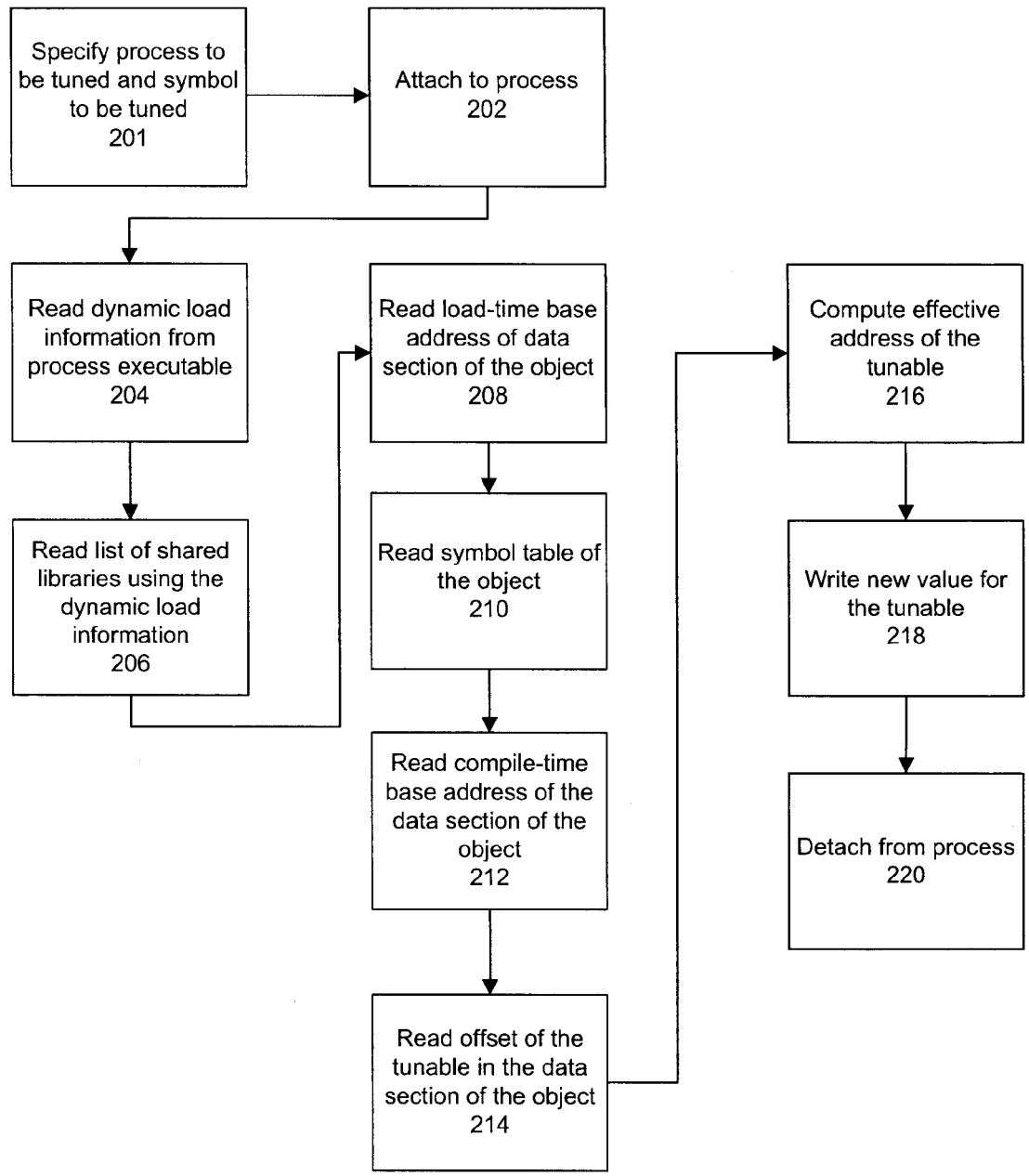
FIG. 2 is a flow chart of a method of dynamic tuning of a user-space process in accordance with an embodiment of the invention.

FIG. 2 is a flow chart of a method 200 of dynamic tuning of a user-space process in accordance with an embodiment of the invention. As discussed below, the symbol to be tuned (i.e. the "tunable") may be within a shared library or within the process executable.

The method 200 may be performed by a software application tool that enables a system administrator or other user to dynamically tune such user-space processes. The software application tool may be one of the application programs 92 depicted in FIG. 1, for example. Various steps (such as 202, 204, 206, 208, 210, 212, 214, 216, 218, and 220) in FIG. 2 may be performed by processor-executable code configured to perform those steps. Specifying or selecting steps (such as 201) may be performed via a user interface configured to enable a user to make those selections.

In Unix-type operating systems, two modes of operation are typically provided: user mode and kernel mode. Kernel mode is a more privileged mode of operation, while user mode is a more protected mode of operation. A process executed in user mode operates in user space, while a process executed in kernel mode operates in kernel space.

Figure 3:
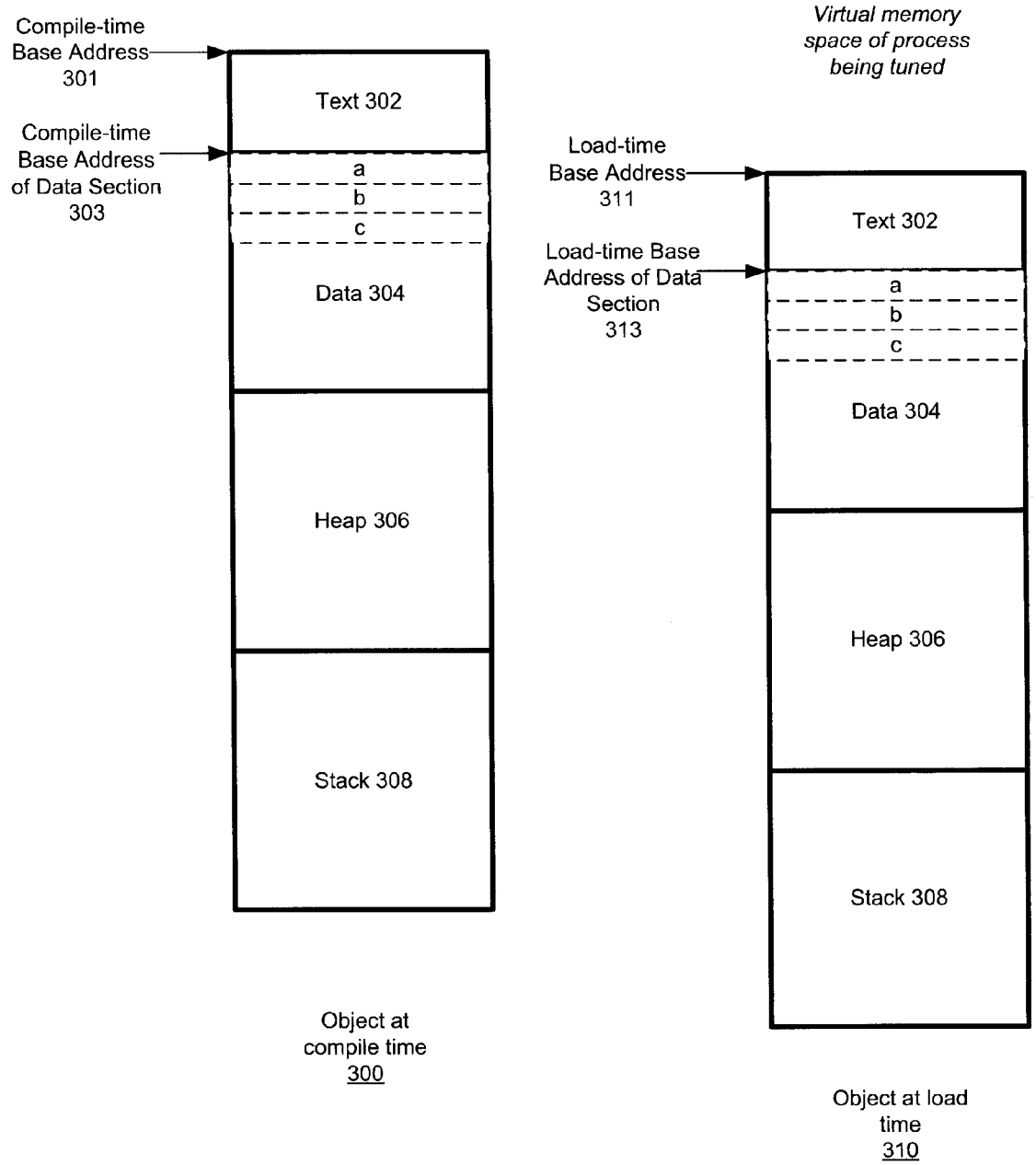
FIG. 3 is a schematic diagram showing sections of an object at compile time and at load time.

FIG. 3 is a schematic diagram showing sections of an object file at compile time 300 and at load time 310. The sections of the object typically include program text 302, data 304, a memory heap 306, a user stack 308, and other sections.

At compile time 300, the text 302 of the object begins at a compile-time base address 301. The data section 304 begins at a compile-time base address 303 which is offset from the compile-time base address 301. Schematically shown within the data section 304 are example variables a, b, and c. These are located at offsets to the compile-time base address 303 of the data section 304.

At load time 310, the text 302 of the object begins at a load-time base address 311 in the virtual memory space of the process. The data section 304 begins at a load-time base address 313 which is offset from the load-time base address 311. The example variables a, b, and c are again schematically shown within the data section 304. These variables are located at offsets to the load-time base address 313 of the data section 304.

Returning to FIG. 2, a first step may involve a user specifying 201 a process to be tuned and a symbol to be tuned. In addition, the user may specify the new value for the symbol to be tuned in this step. For example, under a UNIX type operating system, a user may use a UNIX command to display a list of the user-space processes available for tuning (for example, the UNIX command "ps" displays currently running processes, or the UNIX command "top" displays processor activity), and the process and symbol to be tuned, along with the new value for the symbol, may be specified 201 via a user interface for the software tool. The user interface for the software tool may comprise, for example, a command-line-based interface. An example of such a command-line-based interface is described below. Alternatively, the user interface for the software tool may comprise a type of graphical user interface (GUI).

The software tool then attaches 202 to the selected user-space process while it is running. Attaching 202 to the process enables the software tool to access the user address space for that process. Advantageously, there is no need to restart the process to perform this dynamic tuning.

If objects that are tunable are to include shared libraries, then dynamic load information may be read 204 from the process executable. Using this dynamic load information, a list of the shared libraries used by the process may then be read 206. This list of shared libraries may be displayed via a user interface to the system administrator or other user. Otherwise, if the objects that are tunable do not include shared libraries, then these steps 204 and 206 are unnecessary and may be skipped.

Thereafter, the load-time base address 313 of the data section 304 of the object to be tuned may be read (or determined) 208. This base address 313 indicates the location of the data section 304 of the object within the virtual memory space of the process.

The symbol table of the object may then be read 210. The symbol table provides the symbols used in the object, whether the object is a shared library or the process executable. In one specific implementation, reading of the full symbol table is not needed, and the reading may stop once the symbol to be tuned is located.

The compile-time base address 303 of the data section 304 of the object may then be read (or determined) 212. This base address 303 indicates the location of the data section 304 of the object at compile time.

The offset to the selected tunable may then be read 214. The offset indicates the location of the tunable relative to the base address of the data section. The offset is the same at compile time and at load time.

A computation 216 may then be made as to the effective address of the tunable. The effective address of the tunable is the tunable's address in virtual memory space. The effective address may be computed as equal to the load-time base address 313 of the data section plus the offset to the tunable.

Once the effective address for the tunable is determined, then a new value may be written 218 for that tunable. The new value may be input, for example, by a user via a user interface for the software tool. The new value for the tunable is then advantageously utilized by the process so as to adjust its behavior while the process is running, without the need to restart the process. When the tuning of the process is finished, the software tool may then detach 220 for the process.

For example, one particular implementation of a command-line-based user interface for the software tool may have a usage structure as follows.

---

Usage: dytune -t <tunable> [-p <exe_path> -v <new_value> -s <bytes>] <pid>

--- where the command line tool is named "dytune" (for dynamic tuning), "tunable" refers to the name of the tunable variable, "exe_path" refers to the optional path to the executable being dynamically tuned, "new_value" refers to the optional new value for the tunable variable, "bytes" refers to the optional size of the new_value, and "pid" refers to the process identifier for the instance of the executable which is being dynamically tuned. In this particular implementation, the default number of "bytes" is four.

The following is a first specific usage example. In this example, the tunable variable "spin_limit" is read (but not changed) for the process having pid 7854 where the path to the executable is "/tmp/a.out".

```
$ dytune -t spin_limit_-p /tmp/a.out 7854
Attached to pid <7854>
Working on target '/tmp/a.out' using
libpthread </usr/lib/hpux32/libpthread.so.1> ..
The tunable <spin_limit> is currently set to <1>
Detaching from pid <7854>
$
```

As seen from the above, after the command is entered, the tool reports that it has attached to pid 7854, then that it is working on the target executable file "/tmp/a.out" using a particular pthread library. The tool then reports that the tunable "spin_limit" is currently set to the value 1. The tool then detaches from the process.

The following is a second specific usage example. In this example, the tunable variable "spin_limit" is changed to a new value for the process having pid 7854, where the path to the executable is "/tmp/a.out", and the new value is 10.

```
$ dytune -t spin_limit -p /tmp/a.out -v 10 7854
Attached to pid <7854>
Working on target '/tmp/a.out' using libpthread
</usr/lib/hpux32/libpthread.so.1> ..
The tunable <spin_limit> is currently set to <1>.
The new value will be <10>. Is it Ok (y/n)? y
[Ok, proceeding ...]
Tunable <spin_limit> value changed from [1] to [10].
Detaching from pid <7854>
$
```

As seen from the above, after the command is entered, the tool reports that it has attached to pid 7854, then that it is working on the target executable file "/tmp/a.out" using a particular pthread library. The tool then reports that the tunable "spin_limit" is currently set to the value 1, and that the new value will be 10. Confirmation is requested of the user as to whether this change is okay or not (y or n). Here, the user enters "y" to confirm that the change is okay. The tool then proceeds with the change, and reports the change made when it is done. The tool then detaches from the process.

The above-described dynamic tuning technique modifies the tunable only for the running process; the actual object file remains unchanged. Hence, other instances of the executable would not be affected by tuning this particular instance.

While any symbol having a global scope may be tuned with this approach, it may not be practical to use this technique in all cases. For example, some tunings may have to be performed at the time of process startup itself until the applications are able to dynamically handle them.

The above-disclosed solution has various advantages. This solution provides true dynamic tuning in user space. The use of environment variables may be reduced or eliminated. Environment variables are often considered as error prone, because, if not used correctly, they can affect the whole environment instead of the specific application.

In addition, this solution does not require reserving a signal for configuration needs and does not require allocation of shared memory segments. This mechanism works for both shared libraries and executables.

In the above description, numerous specific details are given to provide a thorough understanding of embodiments of the invention. However, the above description of illustrated embodiments is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for dynamic tuning of a user-space process, the method comprising:
    attaching to the user-space process;
    reading load-time and compile-time base addresses of a data section of an object to be tuned;
    determining an offset to a symbol to be tuned;
    computing an effective address of the symbol; and
    writing a new value for the symbol.

2. The method of claim 1, further comprising reading dynamic load information from an executable for the process.

3. The method of claim 2, further comprising reading a list of shared libraries using the dynamic load information.

4. The method of claim 3 wherein the symbol to be tuned is from a shared library.

5. The method of claim 1, further comprising reading a symbol table of the object prior to determining the offset to the symbol to be tuned.

6. The method of claim 1, further comprising detaching from the user-space process after writing the new value for the symbol.

7. The method of claim 1, wherein the object to be tuned comprises a shared library.

8. The method of claim 1, wherein the method is performed by a software application tool; and wherein the software application tool attaches to the process to be tuned so as to be able to read from and write to the user address space for that process.

9. The method of claim 8, wherein the process to be tuned and the symbol to be tuned are specified using a user interface for the software tool.

10. The method of claim 9, wherein the new value is specified using the user interface for the software tool, and further comprising requesting confirmation from the user prior to writing the new value.

11. An apparatus for dynamic tuning of a user-space process, the apparatus comprising:
    processor-executable code configured to attach to the user-space process;
    processor-executable code configured to read load-time and compile-time base addresses of a data section of an object to be tuned;
    processor-executable code configured to determine an offset to a symbol to be tuned;

processor-executable code configured to compute an effective address of the symbol; and processor-executable code configured to write a new value for the symbol.

12. The apparatus of claim 11, further comprising processor-executable code configured to read dynamic load information from an executable for the process and to read a list of shared libraries using the dynamic load information.

13. The apparatus of claim 12, wherein the symbol to be tuned is from a shared library.

14. The apparatus of claim 11, further comprising processor-executable code configured to read a symbol table of the object prior to determining the offset to the symbol to be tuned.

15. The apparatus of claim 11, wherein the apparatus comprises a software application tool which attaches to the user-space process to be tuned so as to be able to read from and write to the user address space for that process.

16. The apparatus of claim 15, wherein the software application tool detaches from the user-space process after writing the new value for the symbol.

17. The apparatus of claim 11, further comprising a user interface for the software application tool which is used to specify the user-space process, the symbol to be tuned, and the new value.

18. The apparatus of claim 17, wherein the user interface is configured to receive confirmation from the user prior to writing the new value.

19. A computer product comprising non-transitory computer-readable storage media encoded with a software tool for tuning of a user-space process while the process is running and without needing to restart the process, the software tool being configured to, when executed by a processor, provide means for attaching to the user-space process;

means for reading load-time and compile-time base addresses of a data section of an object to be tuned;

means for determining an offset to a symbol to be tuned;

means for computing an effective address of the symbol; and means for writing a new value for the symbol.

20. The computer product of claim 19, further comprising a user interface for the software tool which is used to select the user-space process, the symbol to be tuned, and the new value.

* * * * *